(12) United States Patent
Schmidt

(10) Patent No.: US 7,434,770 B2
(45) Date of Patent: Oct. 14, 2008

(54) PIPE, TUBING AND CONDUIT SUPPORT AND RETAINER

(75) Inventor: William R. Schmidt, 881 Tomochichi Rd., Griffin, GA (US) 30223

(73) Assignee: William R. Schmidt, Griffin, GA (US)

( * ) Notice: Subject to any disclaimer, the term of this patent is extended or adjusted under 35 U.S.C. 154(b) by 331 days.

(21) Appl. No.: 10/992,030

(22) Filed: Nov. 18, 2004

(65) Prior Publication Data
US 2006/0102805 A1    May 18, 2006

(51) Int. Cl.
*F16L 3/00* (2006.01)
(52) U.S. Cl. .......................... 248/49; 248/65
(58) Field of Classification Search .............. 248/49, 248/65, 73, 74.3, 83
See application file for complete search history.

(56) References Cited

U.S. PATENT DOCUMENTS

| | | | | |
|---|---|---|---|---|
| 644,858 A * | 3/1900 | Greenfield | ................ | 248/65 |
| 955,342 A * | 4/1910 | Maxwell | ............. | 137/355.25 |
| 3,809,348 A * | 5/1974 | Di Laura | ................ | 248/49 |
| 4,194,711 A * | 3/1980 | Winton | ................ | 248/49 |
| 4,403,758 A * | 9/1983 | Burt | ................ | 248/49 |
| 4,406,434 A * | 9/1983 | Schneckloth | ............. | 248/83 |
| 4,433,821 A * | 2/1984 | Bolding et al. | ............. | 248/65 |
| 4,503,849 A * | 3/1985 | Morgan et al. | ............. | 128/877 |
| 4,638,966 A * | 1/1987 | Ford | ............. | 248/62 |
| 4,889,168 A * | 12/1989 | Kerzich et al. | ............. | 138/103 |
| 5,601,263 A * | 2/1997 | Thayer | ............. | 248/75 |
| 5,871,306 A * | 2/1999 | Tilcox | ............. | 405/157 |
| 5,939,680 A * | 8/1999 | Gretz et al. | ............. | 174/135 |
| 6,010,099 A * | 1/2000 | Wertz et al. | ............. | 248/55 |
| 6,467,734 B1 * | 10/2002 | Brown et al. | ............. | 248/65 |

* cited by examiner

*Primary Examiner*—Anita M King
(74) *Attorney, Agent, or Firm*—Laurence P. Colton; Smith, Gambrell & Russell (57) ABSTRACT

A device for retaining and supporting pipes having a central curved section between two linear ends and being open to receive one or more pipes therein and serving to protect the pipe from being kinked or bent during construction and post-construction activities. The sides or arms of the device may be extended and bendable such that a pipe may be inserted between the arms and therefore held in place by a spring force. The device may be attached to wall studs or other structures through the use of plumbing straps, which can be weaved through slots in the device to securely hold the pipe(s) in place.

39 Claims, 14 Drawing Sheets

PIPE, TUBING AND CONDUIT SUPPORT AND RETAINER

BACKGROUND OF THE INVENTION

1. Technical Field

The present invention relates generally to a device for supporting and protecting FREON® and other pipes so that the pipes stay in place and so that the pipes do not become kinked or otherwise damaged during construction and post construction activities.

2. Prior Art

Conventional HVAC (heating, ventilation and air conditioning), plumbing, and piping systems generally include one or more pipes that distribute fluids such as water or FREON® to desired locations. These conventional piping systems often are constructed of metal or polyvinyl chloride (PVC) pipes. Often times, these "conduits" are intended to pass from (a) one room to another, (b) one floor to another, or (c) the interior of a building to the exterior. In running these pipes from one area to another, a system must be used to (1) anchor the pipe to a structure and (2) protect the pipe if it could become damaged or kinked particularly during construction and post-construction activities (such as the case with flexible and thin metal or plastic piping).

Particularly susceptible pipes that may become damaged are that of the FREON® lines that pass from the interior to the exterior of a structure and metal or plastic water lines. In typical installations, care must be taken to avoid kinking the pipes during such activities, or the pipe must later be repaired or replaced, costing both additional material and labor costs. Currently, pipes generally are anchored to wall studs using metal or plastic straps with little or no protective support for the pipes. Thus, there is a need for a method and apparatus to allow conduits to be held and protected in such installations. The present invention is directed to these and other needs.

BRIEF SUMMARY OF THE INVENTION

The present invention is directed towards providing a simple and economical pipe support/retainer generally for supporting and protecting conduits during construction and post-construction activities. The present invention also is directed towards a relatively simple device that is easily mounted quickly and securely, and that can support a variety of conduit sizes and in a variety of configurations. The present invention further is directed towards a conduit support/retainer that may include text or other indicators of the types of fluids or materials that are carried by the various conduits to warn of flammability, toxicity, electricity, temperature, etc.

The device preferably features a central bent or curved section between two straight sections resulting in a boomerang-type or banana-type shaped structure. The device is cupped and open on one side to receive one or more pipes therein. The sides or arms of the device are extended and optionally bendable such that a pipe may be inserted between the arms and then when the arms are released, the pipe is held in place by a spring force from the arms. The device may be attached to wall studs (typically 2×4s) or other structures through the use of one or more conventional plumbing straps or other appropriate means. Plumbing straps also may be weaved through slots in the device to securely hold the pipe(s) in place, such as between wall studs or supports.

In a representative installation, one end of a plumbing strap may be affixed to a wall stud by the use of a staple or nail. The loose end of the plumbing strap is threaded through slots in the pipe support and then attached to a second wall stud. After mounting the pipe support, the conduit can be placed into the concave surface of the pipe support. In an alternate preferred embodiment, the pipe is placed in the pipe support before the plumbing strap is attached in order for the plumbing strap to hold the pipe in place against the pipe support. Preferably, the pipe support is strapped between wall studs proximal to the wall board (or other wall material), or where the wall board will be. In this manner, the pipe support will contact the wall board for additional support and stability.

It is preferred that in the case of certain conduits, including FREON® lines that pass from the interior of a structure to the exterior, one end of the pipe support extends beyond the exterior wall to the outside so that the pipe is protected so that it does not become kinked during the finishing of the outside of the structure during construction/post-construction activities, such as the application of siding, stucco, or a brick facade. If desired, the pipe support may be trimmed to be flush with the finished exterior. In a further preferred embodiment, the arms of the pipe support can be extended such that a conduit is snapped in between the arms of the pipe support in order to retain the pipe. Further, as the present invention has a generally simple structure, the device can be manufactured relatively easily and inexpensively and can be mounted quickly and efficiently.

These features, and other features and advantages of the present invention, will become more apparent to those of ordinary skill in the relevant art when the following detailed description of the preferred embodiments is read in conjunction with the appended drawings in which like reference numerals represent like components throughout the several views.

DETAILED DESCRIPTION OF THE PREFERRED EMBODIMENTS

Referring now generally to FIGS. 1-13, preferred embodiments of the invention are shown. The following description is compatible with any type of pipe or conduit, including plumbing pipes, such as hot and cold water, and is also usable with gas lines, cables, electrical conduit and other flexible or inflexible (rigid) lines.

Figure 1:
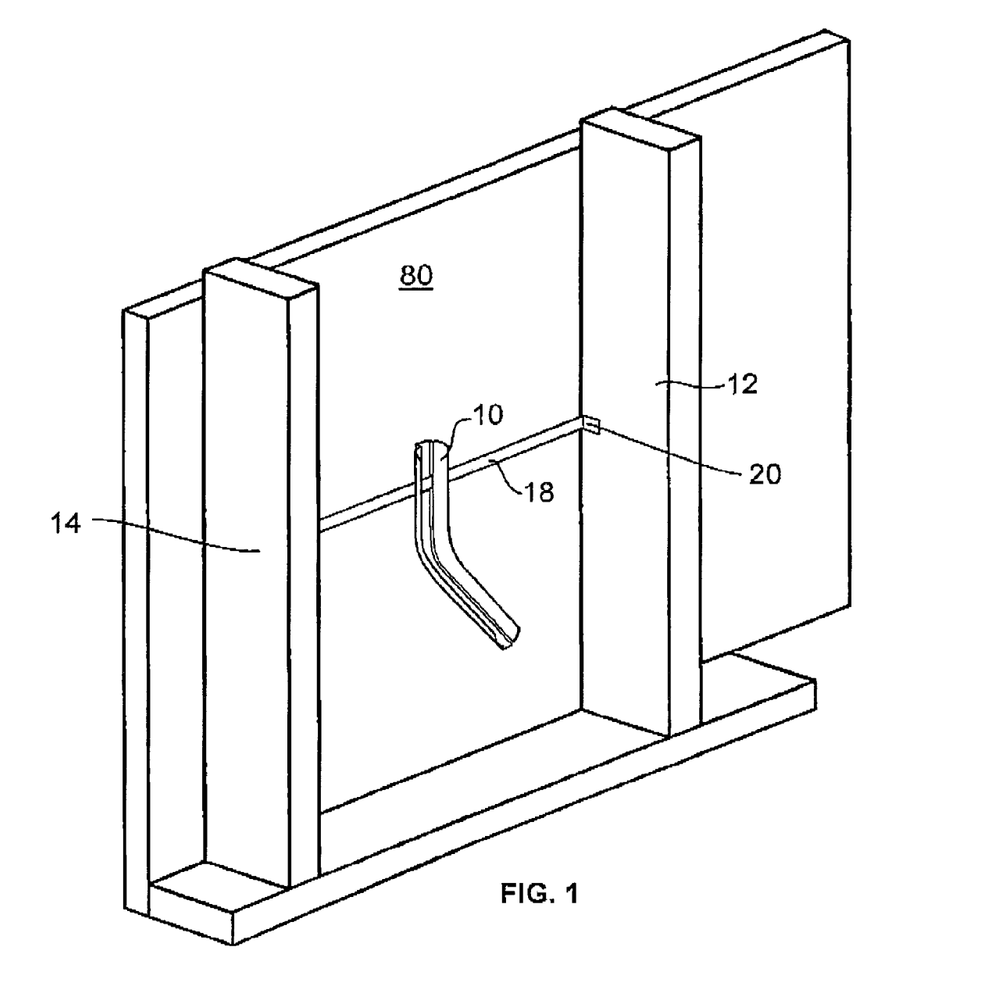
FIG. 1 is a perspective view of a pipe support of the present invention suspended between wall supports.
Figure 2:
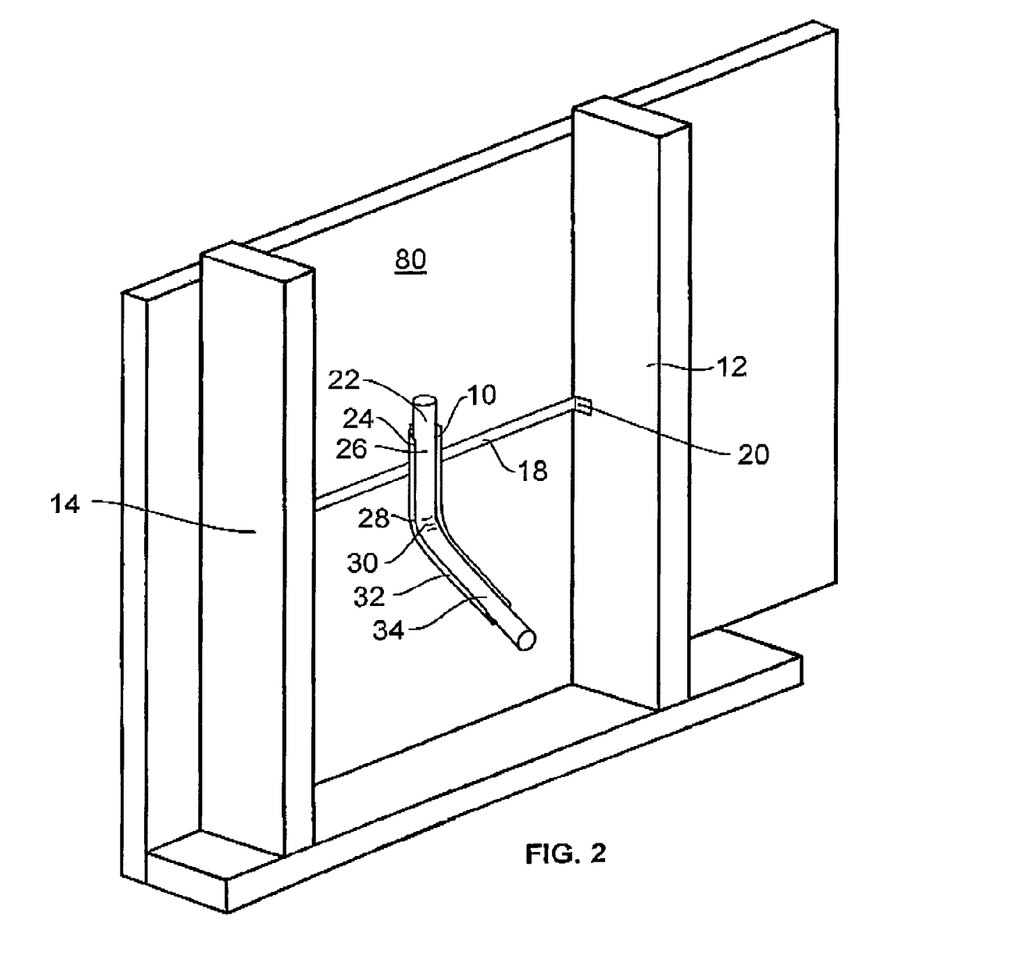
FIG. 2 is a perspective view of the embodiment of FIG. 1 showing a representation pipe with respect to a pipe support of the present invention.

FIG. 1 is a perspective view of a pipe support 10 of the present invention on a plumbing strap 18 that is affixed to vertical supports (such as a wall studs) 12,14 via tabs 20. Though FIG. 1 shows a bend in pipe support 10, this is not necessary. Further, pipe support may be positioned and oriented in any way, though it is shown in a preferred orientation in which pipe support 10 may receive a pipe as shown in FIG. 2. Preferably, pipe support 10 is attached to vertical supports 12, 14 proximal to wall board 80 such that when installed, pipe support 10 contacts wall board 80 for added support and stability.

FIG. 2 is a perspective view of the embodiment of FIG. 1 wherein pipe support 10 is supporting a pipe 22. FIG. 2 also shows that pipe support 10 and pipe 22 may have corresponding upper first end sections 24, 26, respectively, preferably curved or bent middle sections 28, 30, respectively, and lower second end sections 32, 34, respectively. However, it is not necessary that pipe support 10 have three sections and it may have more or less, i.e., it could include one or more bent sections, or even none at all.

Figure 3A:
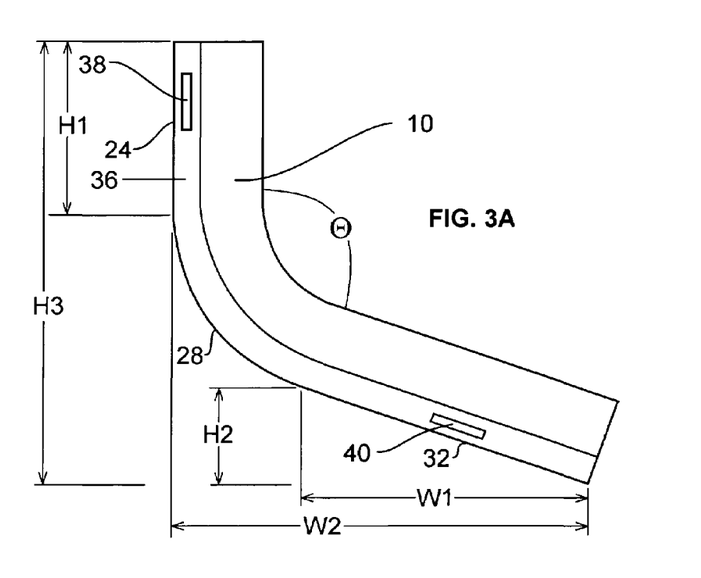
FIG. 3A is a side view of the pipe support of FIGS. 1 and 2.

FIG. 3A is a side view of pipe support 10 of FIGS. 1 and 2. Pipe support 10 may include a vertical section spine 36 that may contain one or more vertical slots 38 in order to mount pipe support 10 to a structure (preferably via plumbing straps 18 as in FIGS. 1 and 2). Pipe support 10 may also include one or more angled/horizontal spine slots 40 that may be utilized to provide additional support and stabilization. The geometry of pipe support 10 can be determined based on the type of installation, type of pipe, etc. such that the overall height H3 of pipe support 10 can be tailored to the particulars of the installation (i.e., upper section height H1 and height of lower section height H2). Similarly, the width of pipe support 10's lower section W1 can be varied with respect to the overall width W2. The bending angle Θ between upper section 24 and lower section 32 is similarly variable. Though a preferred embodiment is shown, pipe support 10 may have any number of vertical, bent or angled segments and any number of slots or holes for mounting pipe support 10 to a structure. Further, pipe support 10 may be attached to a structure through any appropriate means, such as by nailing pipe support 10 to a wall stud, though the use of plumbing straps is preferred in that it allows pipe support 10 to be located away from the wall studs or other structures.

Figure 3B:
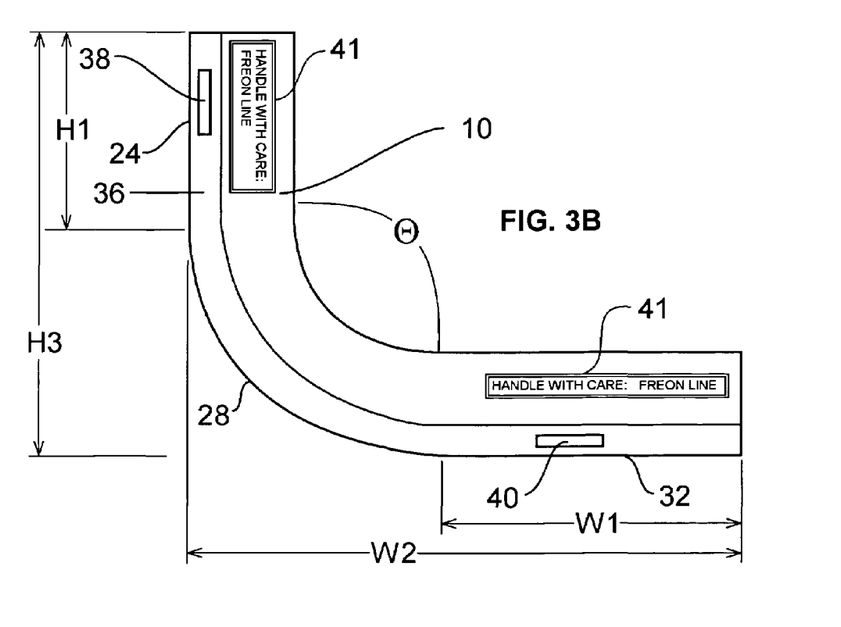
FIG. 3B is a side view of an alternate embodiment of a pipe support of the present invention.

FIG. 3B is a side view of an alternate embodiment of a pipe support of the present invention wherein bending angle Θ is approximately a 90° angle and further including markings or indicators 41 to describe the conduit(s) supported and/or the contents of the conduit(s). Indicators 41 may either be manufactured integrally with pipe support 10, or added subsequently, as in stickers, magnets, or even written by hand, etc. Indicators 41 may be of any suitable indicator including textual indicators (such as Warning: Hot Water, Caution: Flammable, Caution: Toxic, etc.), symbols (such as the international symbol for flammable, corrosive, toxic, etc.), or color coding (such as red for hot, etc.).

Figure 4A:
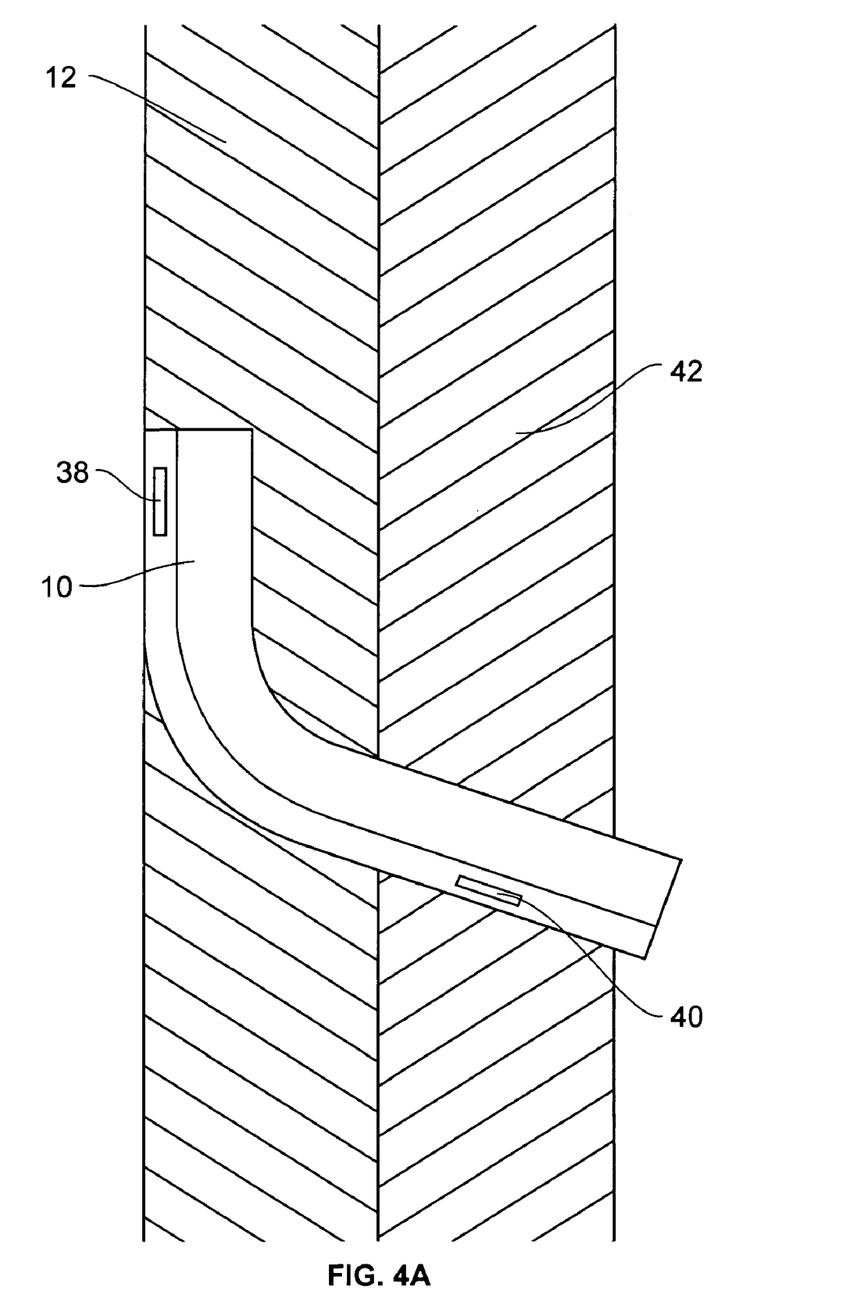
FIG. 4A is a side view of a pipe support of the present invention shown in FIGS. 1 and 3A in place with a brick facade.
Figure 4B:
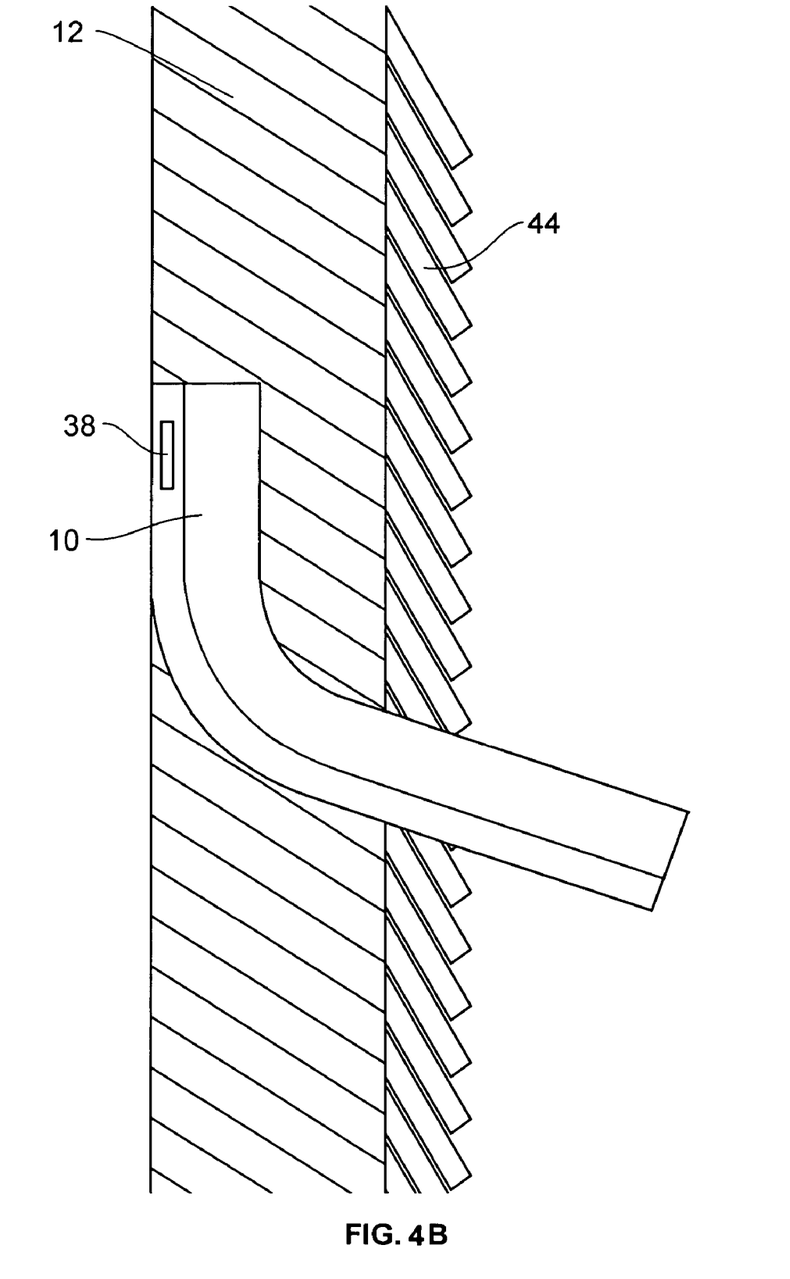
FIG. 4B is a side view of a pipe support of the present invention shown in FIGS. 1 and 3A in place with a siding facade.

FIG. 4A is a side view of a pipe support 10 of the present invention shown in FIGS. 1 and 3A in place with a brick façade 42. Note that pipe support 10 may protrude beyond the brick façade in order to protect pipe 22 from damage during construction/post-construction activities. Once construction activities are completed, pipe support 10 may be trimmed as appropriate or desired. Note that pipe support 10 also may include one or more slots 40 for affixing pipe support 10 to brick façade 42 or any other suitable façade or other structure. Thus, FIG. 4B is a side view of a pipe support of the present invention shown in FIG. 1 and 3A in place with a siding façade 44.

Figure 5A:
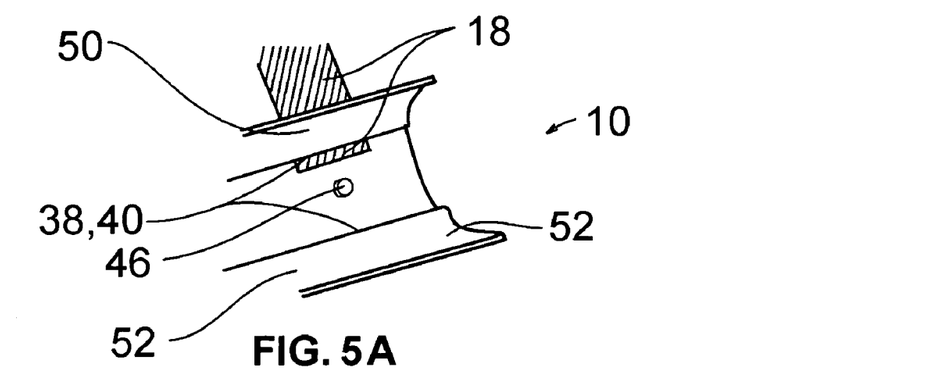
FIG. 5A is a partial top view of a portion of a pipe support of the present invention with a plumbing strap partially inserted.
Figure 5B:
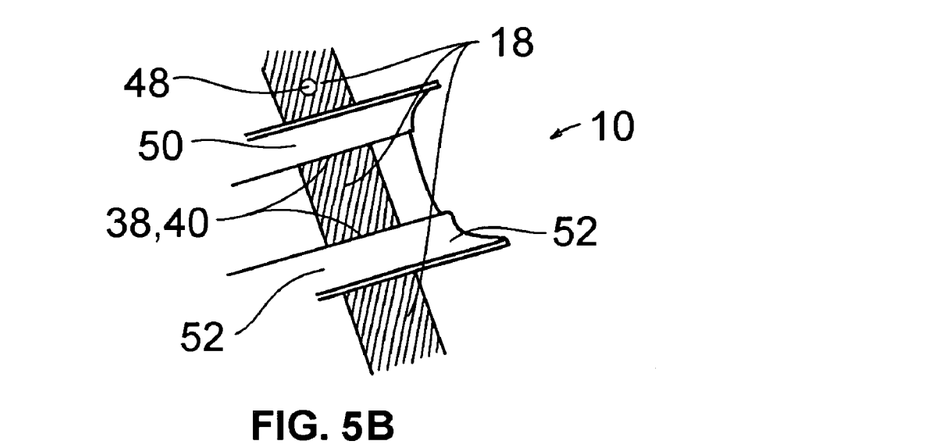
FIG. 5B is a partial top view of a portion of a pipe support of the present invention with a plumbing strap partially inserted.
Figure 5C:
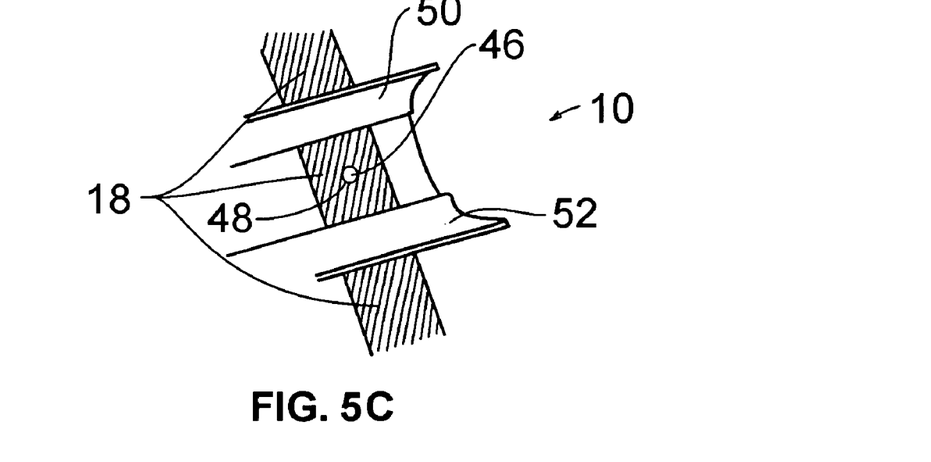
FIG. 5C is a partial top view of a portion of a pipe support of the present invention with a plumbing strap fully inserted.

FIG. 5A is a partial top view of a portion of pipe support 10 with plumbing strap 18 partially inserted through slots 38, 40. Optional nipple 46 on the spine of pipe support 10 can mate with a corresponding optional hole or indented area 48 in plumbing strap 18 as shown in FIG. 5C to help prevent pipe support 10 from sliding along plumbing strap 18 after installation. FIG. 5B shows plumbing strap 18 more fully inserted through pipe support 10 and shows hole 48. FIG. 5C shows plumbing strap 18 fully inserted through pipe support 10 and shows nipple 46 mated with hole 48.

Figure 6A:
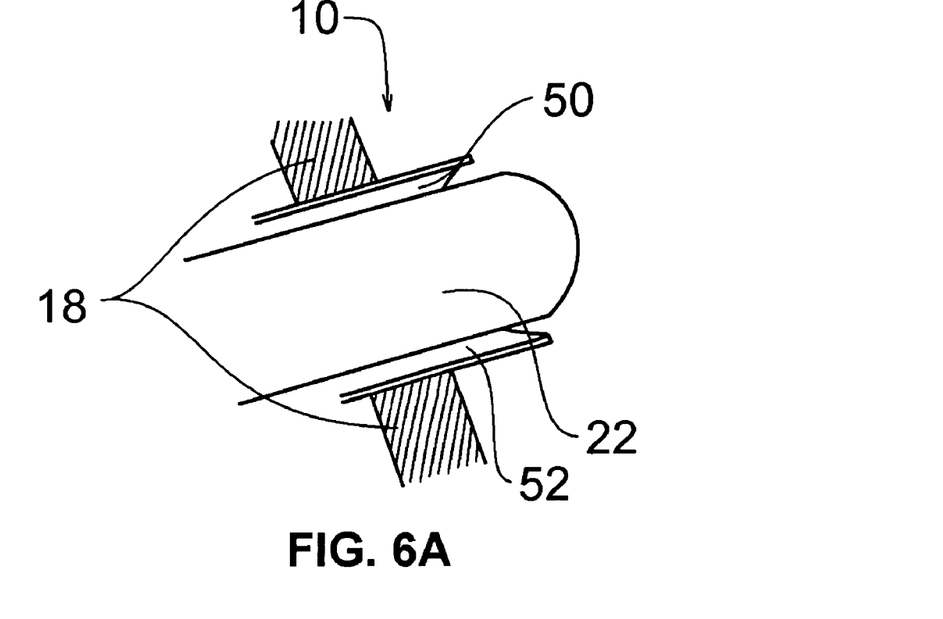
FIG. 6A is a front view of a pipe support of the present invention with a pipe therein.

FIG. 6A is a partial top view of pipe support 10 and pipe 22. Note that plumbing strap 18 is shown in a preferred position behind pipe 22 and arms 50, 52 are to the sides of pipe 22. Though arms 50, 52 may be constructed in any geometry, it may be preferred to have arms 50, 52 extend such that they partially surround or hold pipe 22 in order to retain pipe 22 from undesired movement.

Figure 6B:
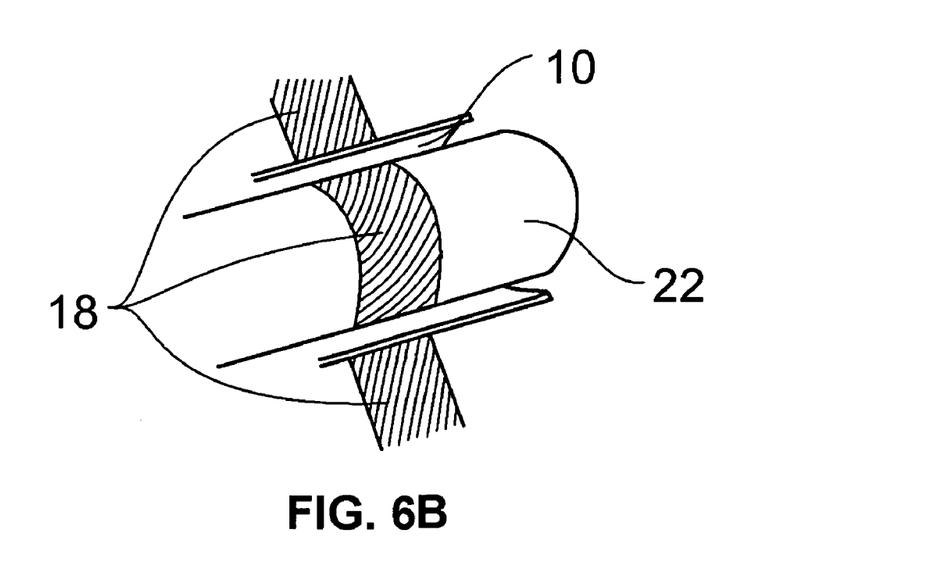
FIG. 6B is a front view and shows an alternate embodiment including one or more slots in the back of the present invention.

FIG. 6B is a partial top view of pipe support 10 and pipe 22 and shows an alternate embodiment wherein plumbing strap 18 is routed around pipe 22 in order to retain pipe 22 within pipe support 10 and from undesired movement. This is particularly advantageous if plumbing strap 18 is somewhat elastic and/or flexible in order to accommodate a variety of pipe diameters and in order to provide some limited freedom of movement for pipe support 10 and/or pipe 22.

Figure 7A:
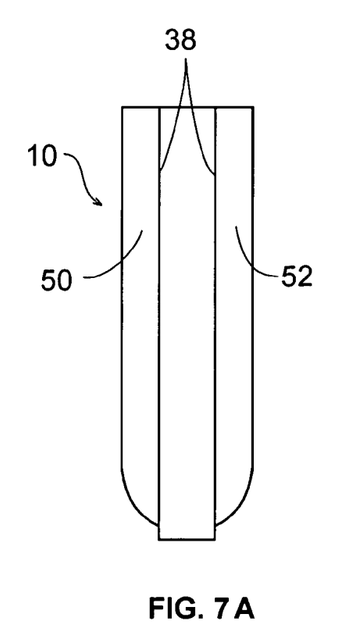
FIG. 7A is a front view of a pipe support of the present invention.

FIG. 7A is a front view of a simple embodiment of pipe support 10 of the present invention from FIG. 3B including sidewalls or protrusions or arms 50, 52 that may serve to support, retain and/or protect pipe 22. It is preferred that arms 50, 52 extend from the side edges of the device as illustrated although it is also acceptable for there to be no arms, or for them to extend from only one side edge or other surface.

Figure 7B:
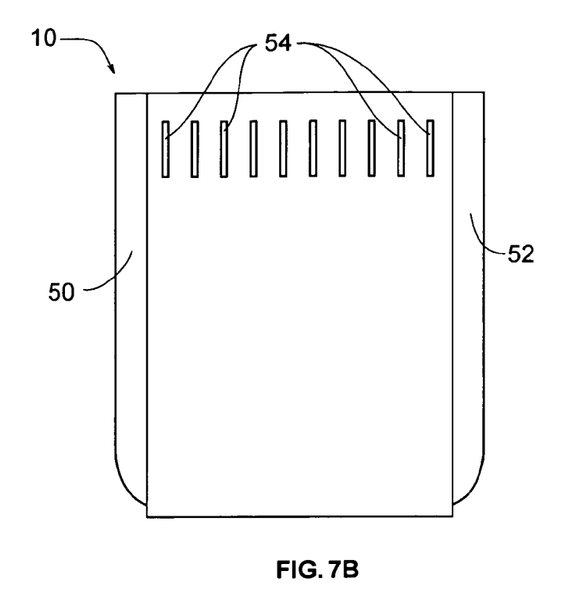
FIG. 7B is a front view of a pipe support of an alternate embodiment of the present invention including several additional slots that allow pipes of various sizes to be supported.
Figure 12:
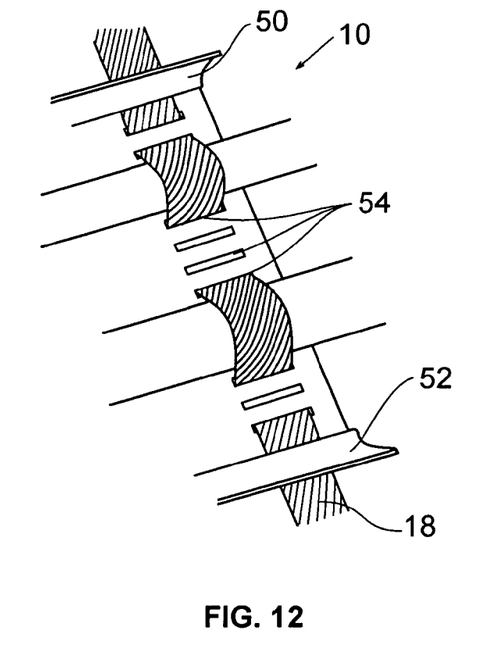
FIG. 12 is a top view of a portion of a preferred embodiment of a pipe support of the present invention as shown in FIG. 8 including several pipes that are restrained by the use of a plumbing strap.
Figure 13:
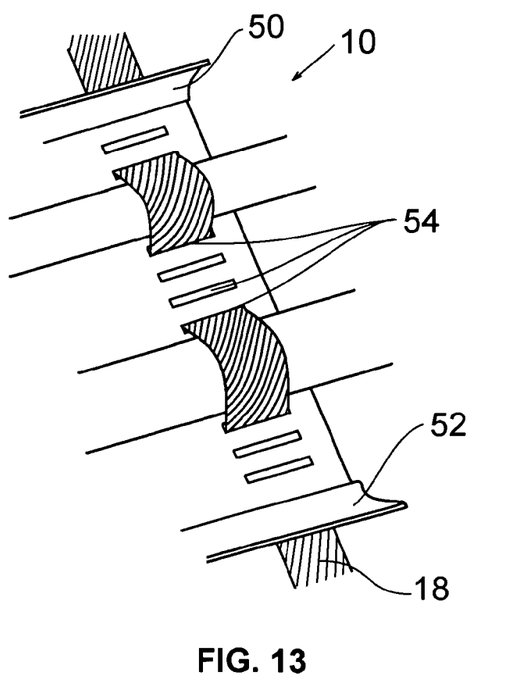
FIG. 13 is a top view of a portion of an alternate preferred embodiment of a pipe support of the present invention from that shown in FIG. 12.

FIG. 7B is a front view of an alternate embodiment of pipe support 10 including one or more supplemental slots 54 that allow pipes of various sizes (and or more than one pipe at a time) to be supported and/or retained. In such a configuration, a plumbing strap (not shown) may be threaded through one or more of slots 54 in order to wrap around the pipe(s), as shown in FIGS. 12 and 13. This embodiment is particularly useful if a person wants to be able to accommodate a variety of pipe diameters or in order for a single pipe support 10 to retain more than one pipe/conduit.

Figure 8:
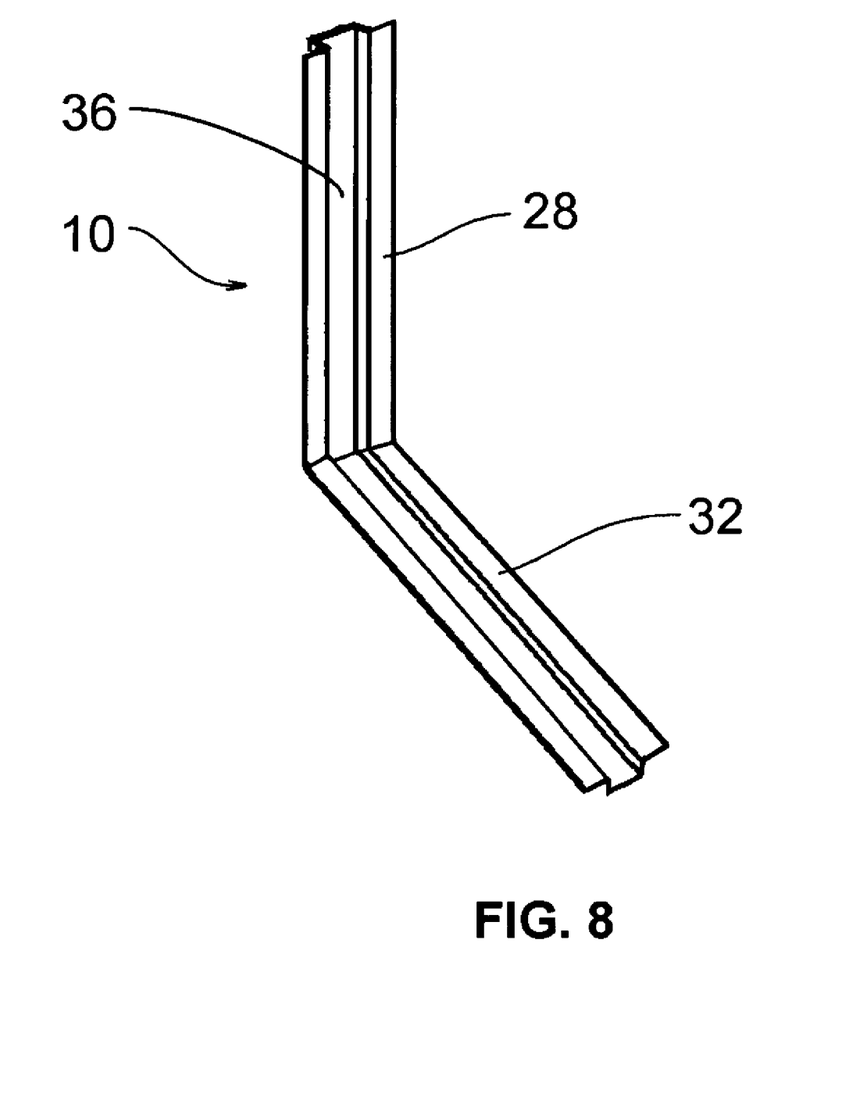
FIG. 8 is a perspective view of a pipe support of an alternate embodiment of the present invention.

FIG. 8 is a perspective view of an alternate embodiment of pipe support 10 comprising first end section 24 and second end section 32 and no curved middle section 28, but including spine 36. In such a configuration, a plumbing strap (not shown) may be threaded through one or more of slots 54 in order to wrap around the pipe(s), as shown in FIGS. 12 and 13 to retain a pipe even without arms as in FIG. 8. This embodiment is particularly useful if a person wants to be able to accommodate a variety of pipe diameters or in order for a single pipe support 10 to retain more than one pipe/conduit and therefore it is suitable if arms 50, 52 are not present.

Figure 9A:
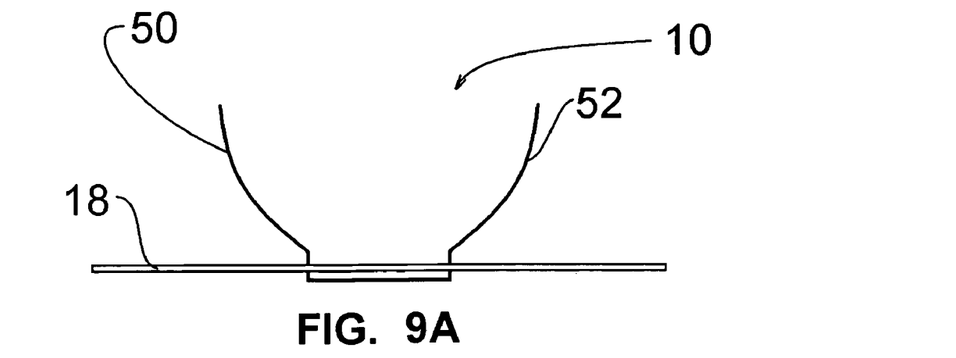
FIG. 9A is a partial section view of a pipe support of the present invention including a plumbing strap.
Figure 9B:
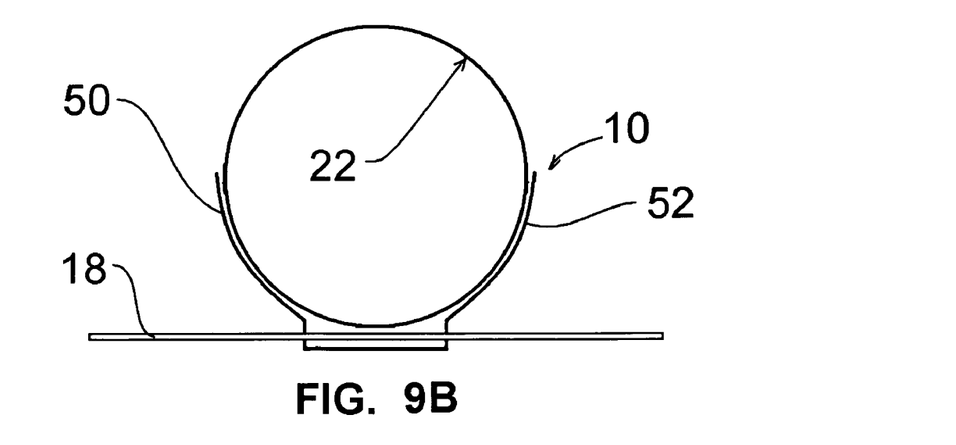
FIG. 9B is a partial section view of the support of the present invention from FIG. 9A including a pipe and a plumbing strap.
Figure 9C:
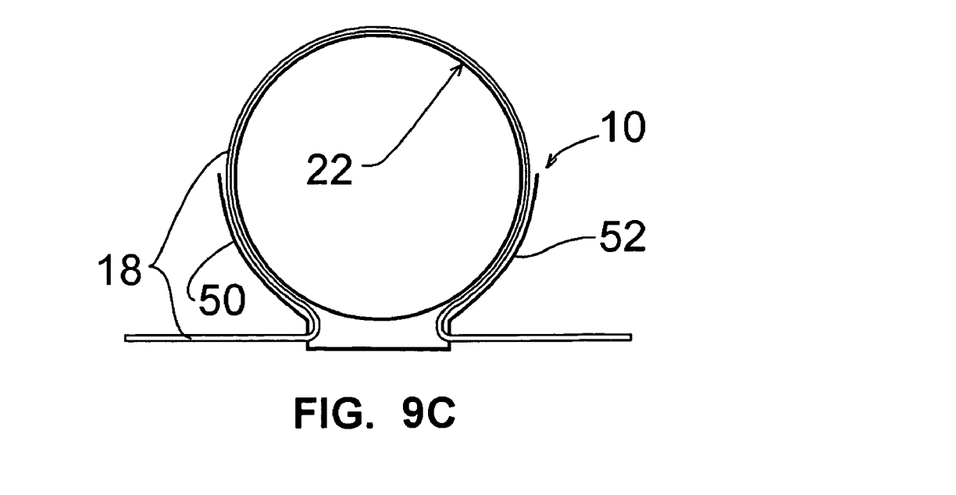
FIG. 9C is a partial section view of a pipe support of the present invention including a pipe and a plumbing strap in a preferred configuration in which the plumbing strap is routed around the pipe.

FIG. 9A is a partial section view of a pipe support 10 of the present invention including plumbing strap 18. This view demonstrates a preferred configuration of arms 50, 52 in which a cross section is approximately U-shaped. It is equally permissible to have larger or other shaped arms or protrusions, or even none at all. FIG. 9B is a partial section view of pipe support 10 of the present invention from FIG. 9A including pipe 22 and plumbing strap 22. FIG. 9C is a partial section view of pipe support 10 including pipe 22 and plumbing strap 18 in an alternate configuration in which plumbing strap 18 is routed around pipe 22 so as to hold pipe 22 in place. In these embodiments, arms 50, 52 extend to form an open cup-like structure into which pipe 22 can be placed. Arms 50, 52 serve as side supports in this embodiment.

Figure 9D:
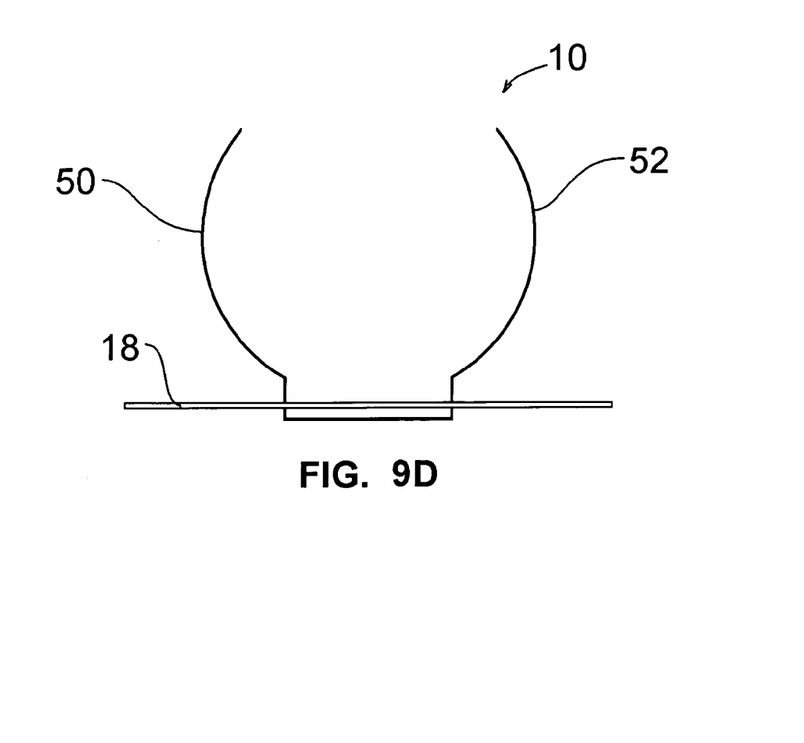
FIG. 9D is a partial section view of an alternate embodiment of a pipe support of the present invention in which the arms of the support are extended.
Figure 9E:
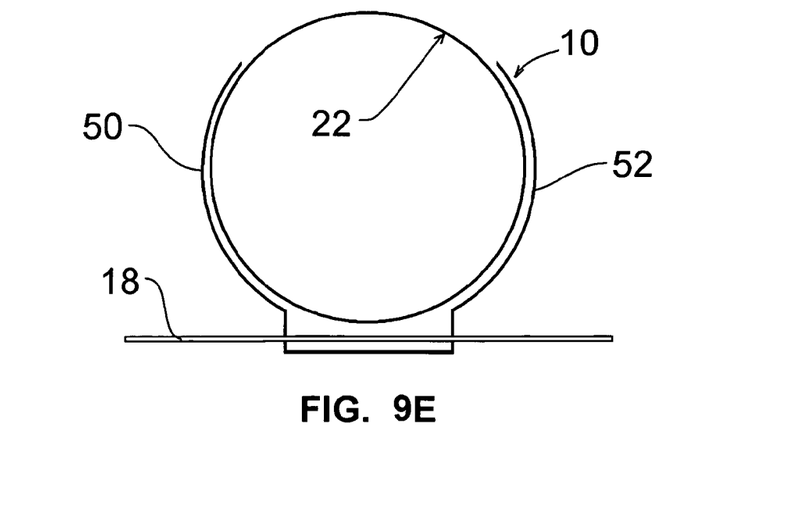
FIG. 9E is a partial section view of the preferred embodiment of a pipe support of the present invention shown in FIG. 9D including a pipe which is removably held by the arms of the support.

FIG. 9D is a partial section view of a preferred embodiment of pipe support 10 in which arms 50, 52 of the support are extended and a cross section of this portion of the invention is C-shaped. Such a pipe support is preferably constructed such that arms 50, 52 provide a spring force in order to retain and/or support pipe 22. FIG. 9E is a partial section view of the pipe support of FIG. 9D including pipe 22 that is preferably removably held by arms 50, 52 of pipe support 10. In this embodiment, arms 50, 52 have some flexibility or elasticity such that arms 50, 52 can be opened, pipe 22 inserted into pipe support 10 between arms 50, 52, and arms 50, 52 will flex back to the unflexed or original position to help secure pipe 22 within pipe support 10.

Figure 10:
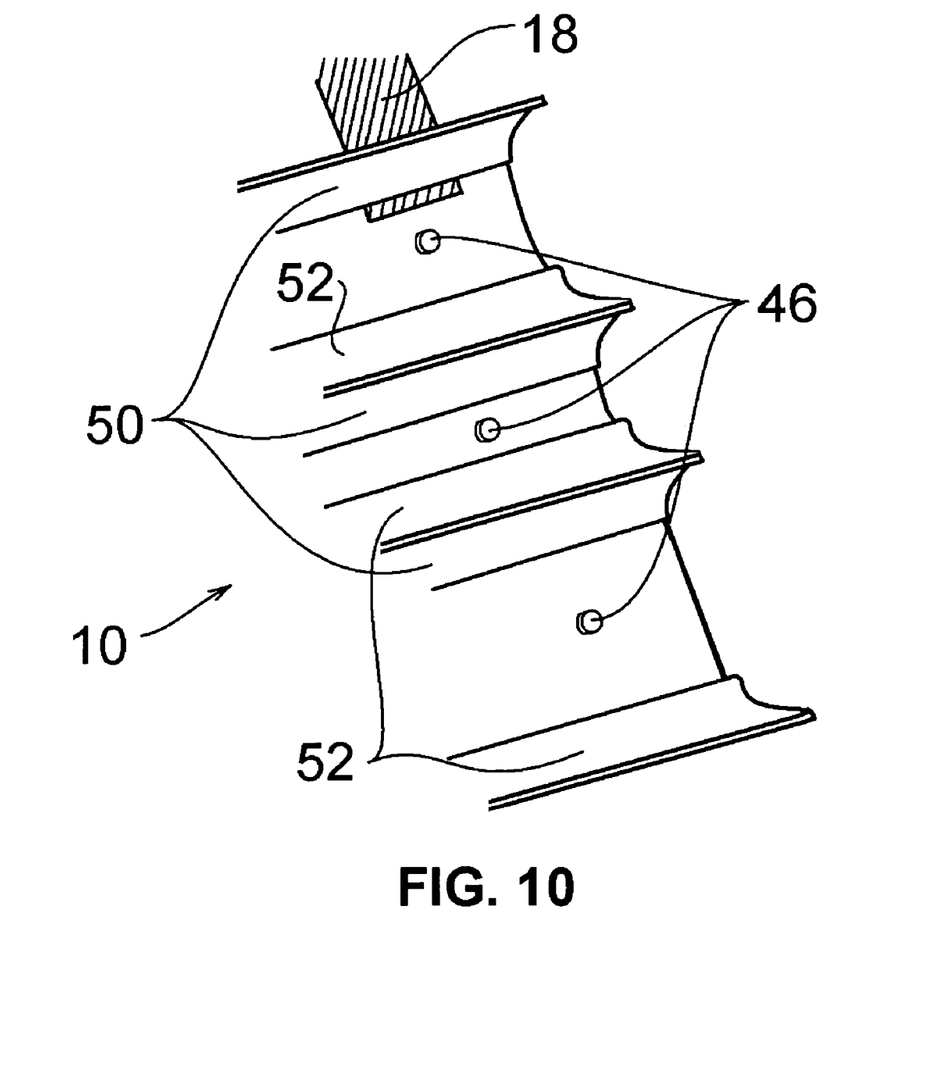
FIG. 10 is top view of a portion of an alternate embodiment of a pipe support of the present invention in which additional arms are situated on the interior of the support to facilitate the use of variously sized pipes.
Figure 11:
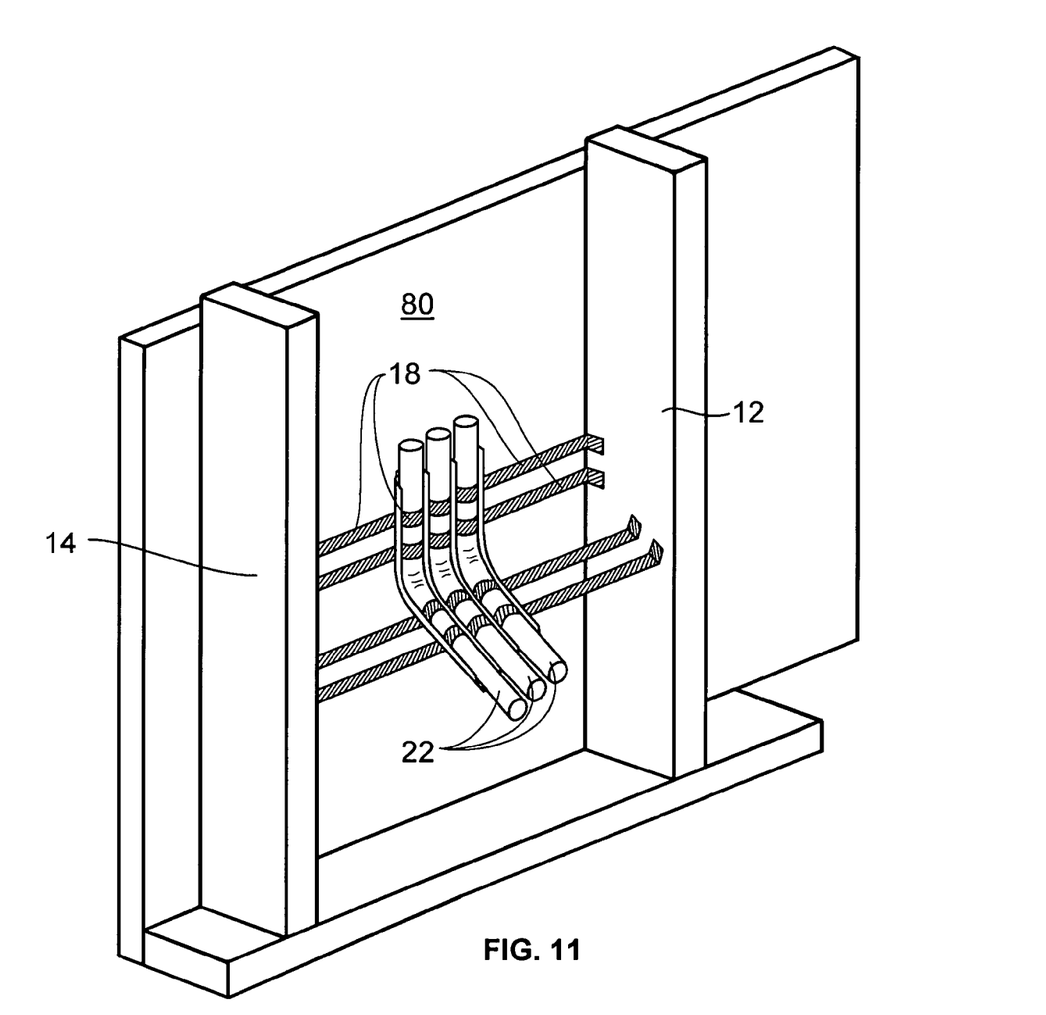
FIG. 11 is a perspective view of the support of FIG. 10 in place including several pipes and plumbing straps.

FIG. 10 is top view of a portion of an alternate embodiment of pipe support 10 in which additional arms are situated on the interior of pipe support 10 to facilitate the support of variously sized pipes and/or more than one pipe. FIG. 11 is a perspective view of the support of FIG. 10 in place including several pipes and plumbing straps 18.

FIG. 12 is a partial top view of an alternate embodiment of pipe support 10 (as shown in FIG. 8) supporting several pipes that are restrained by the use of plumbing strap(s) 18 which is/are woven through various slots 38, 40, 54 in order to retain pipe(s) 22. FIG. 13 is a top view of a portion of an alternate preferred embodiment of pipe support 10 of the present invention from that shown in FIG. 12 and in which plumbing strap 18 does not require slots 38, 40.

In further preferred embodiments, pipe support 10 also can serve as a means for labeling or conveying information regarding pipe(s) 22 and/or the contents carried by pipe(s) 22. Certain information pertaining to pipe 22 can be written on, imprinted on, or attached to pipe support 10. For example, pipe support 10 can be imprinted with information to indicate characteristics such as the type of the fluid carried by pipe 22 (or multiple pipes 22) or whether the fluids conveyed through pipes 22 are flammable. Additionally or alternatively, pipe support 10 can have a color to indicate the type and/or flammability or toxicity of fluids carried by pipe(s) 22.

The relatively simple structure of pipe support 10 can allow it to be manufactured relatively easily with inexpensive materials. Preferably, pipe support 10 can be molded from a single piece of resilient material that can withstand significant weights and temperature fluctuations. Pipe support 10 can be formed of plastic or other resilient material that permits it to deflect and resume its original shape. Such plastics and other materials are evident to and known by those of skill in the art. It is further preferred that the material be capable of providing an elastic spring force if pipe support 10 is intended to retain the pipe(s).

Angle Θ preferably is between 90° and 180°, more preferably is between 90° and 155°, and even more preferably is between 120° and 155°. Height H1 preferably is between 1 inch and 10 inches, more preferably is between 3 inches and 10 inches, and even more preferably is between 3 inches and 8 inches. Width W1 preferably is between 1 inch and 10 inches, more preferably is between 3 inches and 10 inches, and even more preferably is between 3 inches and 8 inches. Middle section 28 preferably has an outer arc of between 1 inch and 10 inches, more preferably between 2 inches and 10 inches, and even more preferably between 2 inches and 4 inches. The distance between arms 50, 52 is variable depending on the type and number of pipes desired to be supported.

In operation, the pipe support of this invention may be used to support and protect pipes 22 more quickly and easily than devices presently on the market and at a very inexpensive unit price. The pipe support 10 of the present invention affords a positive and secure mechanism to support pipes 22. As disclosed herein, pipe support 10 preferably is strapped between wall supports 12, 14. Alternatively, pipe support 10 can be screwed, nailed, adhered (glued) or otherwise attached to wall board 80, wall supports 12, 14, or any other structural feature located in the interior of a wall structure.

The foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

What is claimed is:

1. A device for supporting a pipe comprising:
 a) a first end section having a bottom wall;
 b) a second end section having a bottom wall;
 c) a curved middle section connecting the first end section to the second end section at an angle Θ between 120° and 155°;
 d) at least one slot located through a spine formed on the first end section for attaching the device to a support;

e) arms extending from opposite side edges of at least a portion of the device to at least partially surround the pipe; and f) a strap for holding the pipe in place on the device, the strap also cooperating with the slot for attaching the device to the support, wherein the sections are connected to each other so as to form a structure for receiving and supporting the pipe and the arms are sidewalls extending from at least a portion of the first end section and/or the second end section and wherein the sidewalls provide a spring elastic force for holding the pipe within the device.

2. The device of claim 1, wherein the device is constructed from a single piece of material.

3. The device of claim 1, wherein the first end section has a height H1 of between 1 inch and 10 inches.

4. The device of claim 3, wherein the second end section has a width W1 of between 3 inches and 10 inches.

5. The device of claim 3, wherein the second end section has a width W1 of between 3 inches and 8 inches.

6. The device of claim 3, wherein the second end section has a width W1 of between 1 inch and 10 inches.

7. The device of claim 6, wherein the curved middle section has an outer arc of between 1 inch and 10 inches.

8. The device of claim 6, wherein the curved middle section has an outer arc of between 2 inches and 10 inches.

9. The device of claim 6, wherein the curved middle section has an outer arc of between 2 inches and 4 inches.

10. The device of claim 1, wherein the first end section has a height H1 of between 3 inches and 10 inches.

11. The device of claim 1, wherein the first end section has a height H1 of between 3 inches and 8 inches.

12. The device of claim 1, wherein at least a portion of one of the first end section, the second end section or the curved middle section has a cross section that is U-shaped to at least partially surround the pipe.

13. The device of claim 1, wherein at least a portion of one of the first end section, the second end section or the curved middle section has a cross section that is C-shaped to at least partially surround the pipe.

14. A device for supporting a pipe comprising:
a) a first end section having a bottom wall;
b) a second end section having a bottom wall;
c) a curved middle section connecting the first end section to the second end section at an angle Θ between 120° and 155°;
d) at least one slot located through a spine formed on the first end section for attaching the device to a support;
e) arms extending from opposite side edges of at least a portion of the device to at least partially surround the pipe;
f) a strap for holding the pipe in place on the device, the strap also cooperating with the slot for attaching the device to the support; and
g) at least one protrusion extending from at least one side edge of the bottom wall of at least one of the first end section or the second end section, wherein the protrusion extends in the direction of the pipe so as to assist in supporting the pipe within the device, wherein the sections are connected to each other so as to form a structure for receiving and supporting the pipe.

15. The device of claim 14, wherein the device is constructed from a single piece of material.

16. The device of claim 14, wherein the first end section has a height H1 of between 3 inches and 10 inches.

17. The device of claim 14, wherein the first end section has a height H1 of between 3 inches and 8 inches.

18. The device of claim 14, wherein at least a portion of one of the first end section, the second end section or the curved middle section has a cross section that is U-shaped to at least partially surround the pipe.

19. The device of claim 14, wherein at least a portion of one of the first end section, the second end section or the curved middle section has a cross section that is C-shaped to at least partially surround the pipe.

20. The device of claim 14, wherein the first end section has a height H1 of between 1 inch and 10 inches.

21. The device of claim 20, wherein the second end section has a width W1 of between 3 inches and 8 inches.

22. The device of claim 20, wherein the second end section has a width W1 of between 3 inches and 10 inches.

23. The device of claim 20, wherein the second end section has a width W1 of between 1 inch and 10 inches.

24. The device of claim 23, wherein the curved middle section has an outer arc of between 1 inch and 10 inches.

25. The device of claim 23, wherein the curved middle section has an outer arc of between 2 inches and 10 inches.

26. The device of claim 23, wherein the curved middle section has an outer arc of between 2 inches and 4 inches.

27. A device for supporting a pipe comprising:
a) a first end section having a bottom wall;
b) a second end section having a bottom wall;
c) a curved middle section connecting the first end section to the second end section at an angle Θ between 120° and 155°, wherein the curved middle section comprises a bottom wall and at least one protrusion extending from the bottom wall of at least one of the first end section, the second end section, or the curved middle section, and wherein the at least one protrusion extends in the direction of the pipe so as to assist in supporting the pipe within the device;
d) at least one slot located through a spine formed on the first end section for attaching the device to a support;
e) arms extending from opposite side edges of at least a portion of the device to at least partially surround the pipe; and
f) a strap for holding the pipe in place on the device, the strap also cooperating with the slot for attaching the device to the support, wherein the sections are connected to each other so as to form a structure for receiving and supporting the pipe.

28. The device of claim 27, wherein the device is constructed from a single piece of material.

29. The device of claim 27, wherein the first end section has a height H1 of between 1 inch and 10 inches.

30. The device of claim 29, wherein the second end section has a width W1 of between 1 inch and 10 inches.

31. The device of claim 30, wherein the curved middle section has an outer arc of between 1 inch and 10 inches.

32. The device of claim 30, wherein the curved middle section has an outer arc of between 2 inches and 10 inches.

33. The device of claim 30, wherein the curved middle section has an outer arc of between 2 inches and 4 inches.

34. The device of claim 29, wherein the second end section has a width W1 of between 3 inches and 10 inches.

35. The device of claim 29, wherein the second end section has a width W1 of between 3 inches and 8 inches.

36. The device of claim 27, wherein the first end section has a height H1 of between 3 inches and 10 inches.

37. The device of claim 27, wherein the first end section has a height H1 of between 3 inches and 8 inches.

38. The device of claim 27, wherein at least a portion of one of the first end section, the second end section or the curved middle section has a cross section that is U-shaped to at least partially surround the pipe.

39. The device of claim 27, wherein at least a portion of one of the first end section, the second end section or the curved middle section has a cross section that is C-shaped to at least partially surround the pipe.

* * * * *